(12) United States Patent
Buchmueller (10) Patent No.: US 10,178,315 B1
(45) Date of Patent: Jan. 8, 2019

(54) IMAGE CAPTURE IN A VIBRATIONAL ENVIRONMENT

(71) Applicant: Amazon Technologies, Inc., Seattle, WA (US)

(72) Inventor: Daniel Buchmueller, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 204 days.

(21) Appl. No.: 15/226,572

(22) Filed: Aug. 2, 2016

Related U.S. Application Data (63) Continuation of application No. 15/197,550, filed on Jun. 29, 2016, now abandoned.

(51) Int. Cl.
*H04N 7/18* (2006.01)
*H04N 5/232* (2006.01)
*B64C 39/02* (2006.01)
*B64D 47/08* (2006.01)

(52) U.S. Cl.
CPC ....... *H04N 5/23267* (2013.01); *B64C 39/024* (2013.01); *B64D 47/08* (2013.01); *B64C 39/028* (2013.01); *B64C 2201/042* (2013.01); *B64C 2201/104* (2013.01); *B64C 2201/108* (2013.01); *B64C 2201/127* (2013.01); *B64C 2201/145* (2013.01)

(58) Field of Classification Search
CPC ...... G01C 11/025; G01C 11/02; H04N 7/005; H04N 7/18; H04N 7/181
USPC ......................................... 348/144
See application file for complete search history.

(56) References Cited

U.S. PATENT DOCUMENTS

| | | | |
|---|---|---|---|
| 7,581,702 B2* | 9/2009 | Olson | H04W 4/70 244/189 |
| 8,157,205 B2* | 4/2012 | McWhirk | B64B 1/02 212/274 |
| 8,355,818 B2* | 1/2013 | Nielsen | G05D 1/0088 340/628 |
| 9,415,870 B1* | 8/2016 | Beckman | B64C 39/024 |
| 9,422,055 B1* | 8/2016 | Beckman | B64C 39/024 |
| 9,501,060 B1* | 11/2016 | Zhang | B64C 39/024 |
| 9,835,453 B2* | 12/2017 | Michini | G01C 15/06 |

(Continued)

OTHER PUBLICATIONS

Choi et al, Wearable Gesture Control of Agile Micro Quadrotors (Year: 2017).*

(Continued)

*Primary Examiner* — Shan E Elahi
(74) *Attorney, Agent, or Firm* — Lee & Hayes, PLLC (57) ABSTRACT

This disclosure describes optimizing a clarity of images captured by a camera exposed to vibrations, such as a camera mounted on an aerial vehicle. The vibrations can be caused by rotors, motors, forces (e.g., lift, drag, etc.) acting on the UAV, environmental factors (e.g., wind, turbulence, etc.), or any other force that may cause asymmetry. An inertial measurement unit can measure the vibrations and determine a vibrational pattern imposed upon the camera. The inertial measurement unit can identify one or more dead points in the vibrational pattern, and times associated therewith. The inertial measurement unit can send the one or more dead points and/or the times associated therewith to the camera, and cause the camera to capture and/or store images at times corresponding to the one or more dead points to enable capture of images with little or no blur.

20 Claims, 8 Drawing Sheets

(56) References Cited

U.S. PATENT DOCUMENTS

| | | | | |
|---|---|---|---|---|
| 2009/0152391 | A1* | 6/2009 | McWhirk | B64B 1/02 |
| | | | | 244/30 |
| 2011/0054689 | A1* | 3/2011 | Nielsen | G05D 1/0088 |
| | | | | 700/258 |
| 2016/0004795 | A1* | 1/2016 | Novak | G06F 17/5009 |
| | | | | 703/1 |
| 2016/0068267 | A1* | 3/2016 | Liu | B64C 39/024 |
| | | | | 701/11 |
| 2016/0200438 | A1* | 7/2016 | Bokeno | B64C 39/024 |
| | | | | 244/2 |
| 2016/0209839 | A1* | 7/2016 | Hoareau | G05D 1/0027 |
| 2016/0257423 | A1* | 9/2016 | Martin | B64F 1/00 |
| 2016/0307447 | A1* | 10/2016 | Johnson | G05D 1/0044 |

OTHER PUBLICATIONS

Franco et al, An Embedded system design for a two-axis camera platform control used in unmanned aerial vehicles (Year: 2017).*

* cited by examiner

IMAGE CAPTURE IN A VIBRATIONAL ENVIRONMENT

RELATED APPLICATIONS

This application claims priority to and is a continuation of U.S. patent application Ser. No. 15/197,550, filed on Jun. 29, 2016, the entire contents of which are incorporated herein by reference.

BACKGROUND

Unmanned aerial vehicles (UAVs) have become increasingly popular. UAVs of all shapes and sizes are constructed for a myriad function. Among the many popular functions of UAVs is aerial photography. However, taking pictures from a UAV can pose many problems, such as blur due to vibrations generated during operation of the UAV.

Traditionally, aerial photography systems use vibration dampening hardware in an attempt to lessen the blur caused by vibrations. However, the vibration dampening hardware can be heavy and cumbersome, thereby affecting flight characteristics of the UAV, such as decreasing payload available, increasing drag and decreasing range. These types of dampening hardware may be especially ill suited for use on small UAVs or micro UAVs that have little or no capacity for payload.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

This disclosure provides methods, apparatuses, and systems for optimizing clarity of images captured by a camera exposed to vibrations. In some embodiments, the camera can be mounted on an aerial vehicle, such as an unmanned aerial vehicle (UAV). In such embodiments, the vibrations can be caused by rotors, motors, forces (e.g., lift, drag, etc.) acting on the UAV, environmental factors (e.g., wind, turbulence, etc.), and/or any other force that may cause asymmetry. For example, a quad-copter configured for aerial photography (e.g., with a camera system) may include four rotors, each coupled to an airframe by a spar. As each of the rotors rotate to generate lift, the quad-copter may experience a vibration caused by the rotors passing the respective spars. The vibration may be transmitted to the camera system mounted on the airframe.

The UAV can include an inertial measurement unit (IMU) to measure a vibrational pattern experienced by the airframe and/or the camera. The vibrational pattern can be harmonic, e.g., constant over time. For example, a UAV flying straight and level may experience substantially the same harmonic vibrations throughout the flight. For another example, a UAV executing maneuvers in flight (e.g., turns, climbs, descents, etc.) may experience different vibrations over time. As such, the vibrational pattern over time may be random.

The IMU can measure accelerations and dead points in the vibrations. The dead points can be short periods of time (e.g., 1/60 second, 1/240 second, etc.) in which there is minimal to no acceleration in the vibrational pattern. In various examples, the IMU can send a signal to the camera to capture images (e.g., entire images, pixels of an image, etc.) during one or more of the dead points in the vibrations. In some examples, the IMU can send the times associated with dead points to a computing system configured to post-process a plurality of images. In such examples, the computing system may receive the plurality of images from the camera, store the images captured during dead points, and discard other images.

In various examples, the UAV and/or the camera may experience high frequency vibrations. In such examples, the dead points may span a shorter time than during low frequency vibrations. In some examples, the camera may increase a shutter speed in order to capture a plurality of images corresponding to dead points. Due to the increased shutter speed, the plurality of images captured may be underexposed. In some examples, the IMU may send times associated with the dead points to the camera, and the camera may pre-process the underexposed images by comparing the times associated with the dead points to a capture time of each of the images. Responsive to determining that a capture time corresponds to a dead point, the camera can store an image. Additionally, the camera can discard images that do not correspond to dead points. In such examples, the camera may send the images to the computing system for post-processing, such as blending (e.g., combining) the multiple underexposed images.

In various examples, the camera may send the plurality of underexposed images to the computing system for pre and post-processing. In such examples, the IMU may send times associated with the dead points to the computing system. The computing system may compare the times associated with the images to the times associated with the dead points, and discard images that do not correspond to dead points. The computing system may blend the remaining underexposed images into a darker or richer (e.g., fully exposed) image.

In various examples, the camera may receive a signal from an image sensor. The signal can include a period of time in which the camera shutter, such as an electronic shutter, is to remain open to collect light. The camera can receive times associated with the dead points from the IMU. In various examples, the times associated with the dead points can include a sequence of times, such as, for example, a dead point occurs every 5 milliseconds (ms), every 10 ms, etc. Responsive to receiving the times, the camera can collect pixels at times of minimal or no vibration. The pixels collected over the shutter cycle can comprise a collected image. In various examples, the camera may send the collected image to the computing system for post-processing. In such examples, the post processing can include a determination that the collected image is underexposed. Based on the determination that the collected image is underexposed, the computing system can cause the image sensor to elongate the shutter cycle (e.g., instruct the shutter to remain open longer).

The apparatuses, techniques, and systems described herein may be implemented in a number of ways. Though described with reference to UAVs, the image capturing optimization system is not limited to use with UAVs. Instead, the image capturing optimization system may be implemented on many other types of flying (e.g., manned aircraft, spacecraft, etc.) or non-flying vehicles (e.g., autonomous cars, trucks, tractors, bicycles), hand-held cameras, and the like. Example implementations of the image capturing optimization system are provided below with reference to the following figures.

Figure 1:
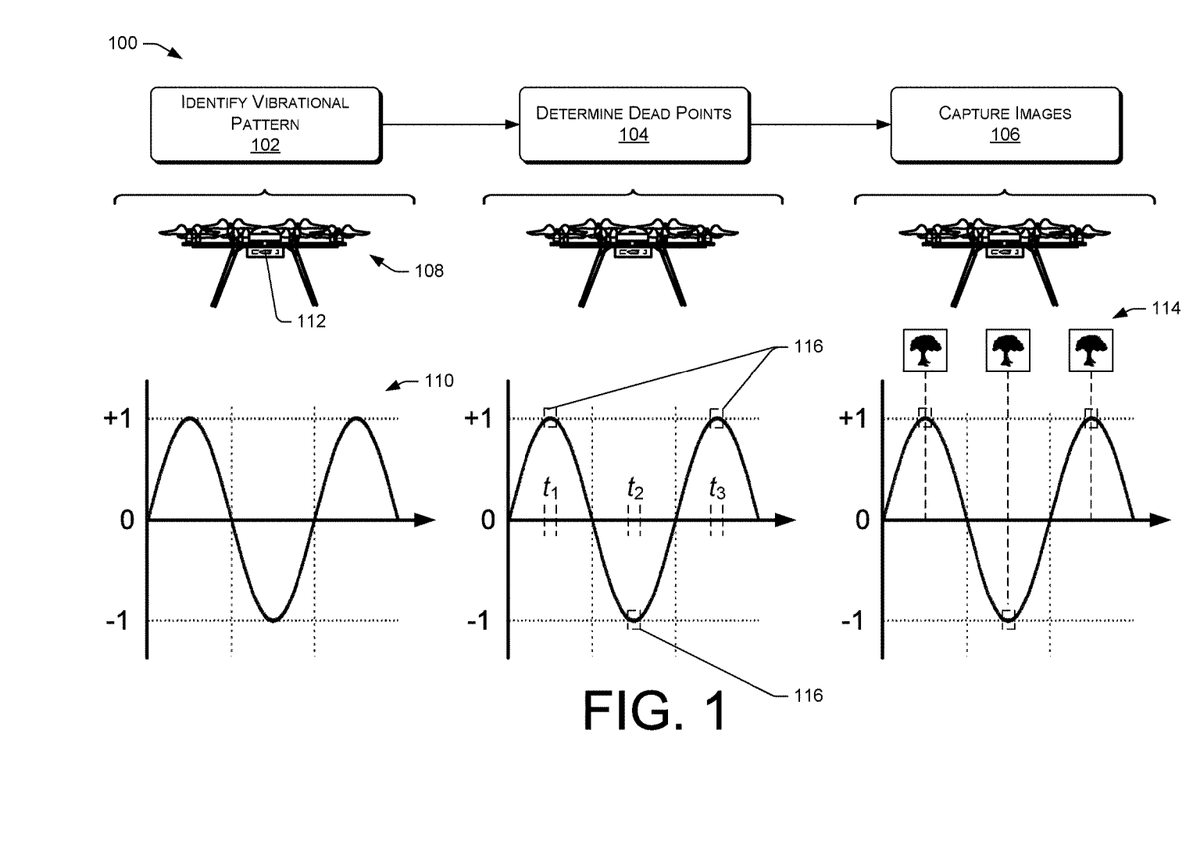
FIG. 1 is a pictorial flow diagram of an example process of an image capture optimization system.

FIG. 1 is a pictorial flow diagram of an example process 100 of an image capture optimization system. At 102, a UAV 108 can identify a vibrational pattern 110 imposed upon an airframe of the UAV 108. The vibrational pattern 110 can be caused by rotors, motors, forces acting on the UAV 108 (e.g., lift, drag, etc.), environmental factors (e.g., wind, turbulence, etc.), and/or any other force that may cause asymmetry. The vibrational pattern can be identified by an inertial measurement unit (IMU) in the UAV 108. In various examples, the IMU can be mounted in the airframe of the UAV 108. In some examples, the IMU can be mounted in, on, and/or proximate to a camera 112 used to collect images 114.

In various examples, the surface on which the camera 112 is mounted (e.g., an airframe, a fuselage, a wing, etc.) may experience a substantially uniform vibrational pattern. In such examples, the UAV 108 may include an IMU for each surface with a substantially uniform vibrational pattern. For example, a quad-copter airframe on which one or more cameras may be mounted may experience a substantially uniform vibrational pattern. As such, the quad-copter may only require one IMU to measure the vibrational pattern and to transmit vibrational pattern information to the camera(s) and/or the computing system. For another example, a fixed wing aircraft may experience a first vibrational pattern on a first wing and a second vibrational pattern on a second wing. In such an example, the fixed wing aircraft may include a first IMU for one or more cameras mounted on the first wing and a second IMU for one or more cameras mounted on the second wing.

At 104, the IMU can determine dead points 116 of the vibrational pattern 110. The dead points 116 can include time windows of the vibrational pattern 110 in which there is little to no acceleration. The time window can represent a period of time in which a camera can capture a clear and crisp image (e.g., an image with little to no blur caused by camera shake). In FIG. 1, the time windows are illustrated as $t_1$, $t_2$, and $t_3$. In other examples, the time windows can be longer or shorter. For example, the time windows of a high frequency vibration can be significantly shorter. For another example, the time windows of an ultra-low frequency vibration can be longer.

At 106, the camera on the UAV 108 can capture images 114. To capture an image, the camera 112 triggers a shutter to open and close (e.g., shutter cycle). In various examples, the shutter can be a mechanical shutter. In such examples, the mechanical shutter can use shutter curtains which open and close to produce an exposure. In some examples, the shutter can be an electronic shutter. In such examples, the shutter cycle can occur by engaging an image sensor (e.g., turning the image sensor on and off) to control exposure and/or a rate of pixel capture. The image sensor can be a charge coupled device (CCD), a complementary metal oxide semiconductor (CMOS), or other image sensor. In various examples, the IMU can send the camera 112 a signal including the time windows (e.g., times associated with the dead points). In such examples, responsive to the signal, the camera 112 can trigger the shutter to cycle during the time windows, thereby capturing clear and crisp images and/or pixels of images that include little or no blur.

In various examples, the camera 112 can first capture a plurality of images, and then receive the signal including the time windows from the IMU. In such examples, the camera 112 can store images captured during the time windows, and discard the other images. In some examples, the IMU can send the signal including the time window and the camera 112 can send the plurality of images to the computing system. In such examples, the computing system can compare times associated with each of the plurality of images to the time windows. The computing system can then store images captured during the time windows, and discard other images.

Figure 2:
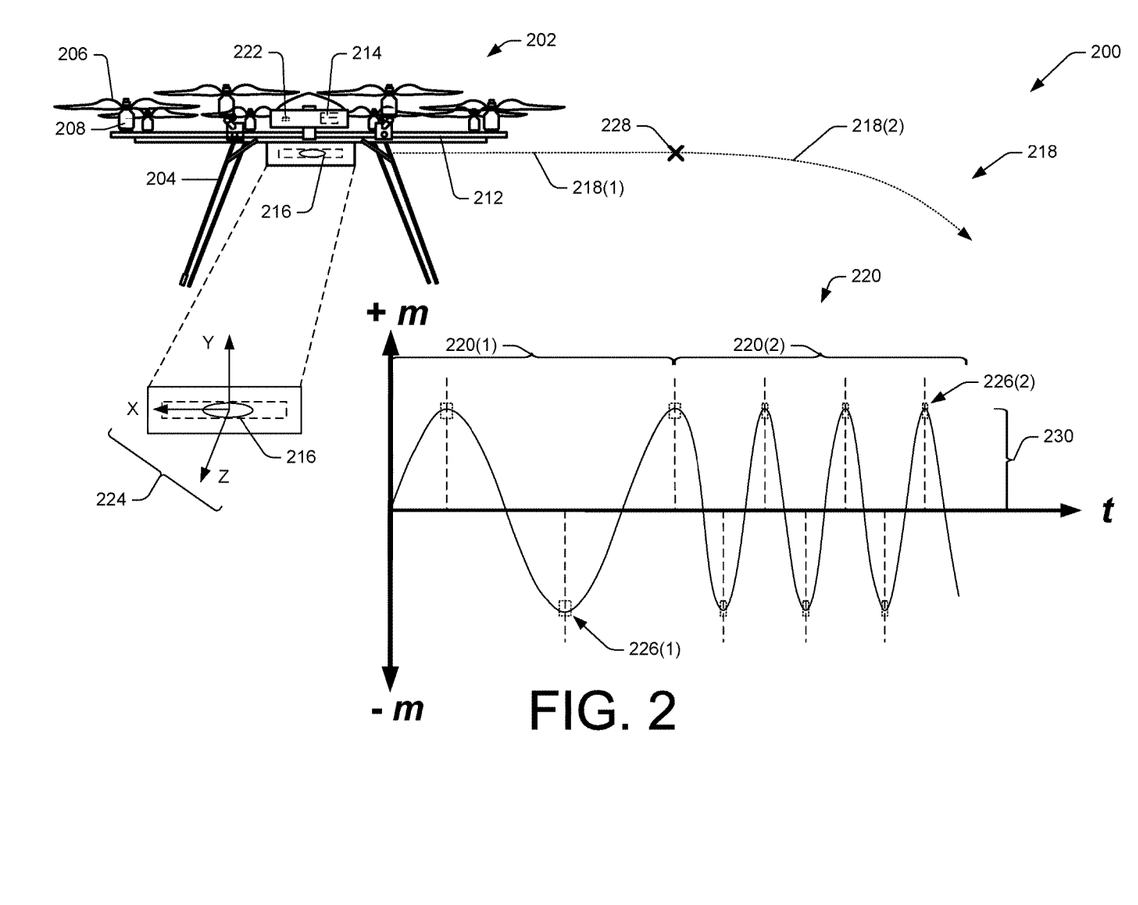
FIG. 2 is a schematic diagram showing an example environment where an image capture optimization system may anticipate vibrational changes to be imposed on a camera due to changing flight conditions.

FIG. 2 is a schematic diagram showing an example environment 200 where an image capture optimization system may anticipate vibrational changes to be imposed on a camera. The UAV 202 has an airframe 204, one or more rotors 206, and one or more motors 208. In some examples, the UAV 202 may include a fuselage (e.g., airframe) and two or more fixed wings protruding from the airframe. In such examples, the UAV 202 may also include vertical and/or horizontal stabilizers coupled to the airframe.

The airframe 204 may comprise carbon fiber, titanium, aluminum, plastic, combinations thereof, or any other material appropriate for aircraft construction. In various examples, the airframe 204 may comprise rotor guards to protect the one or more rotors 206. In such examples, the rotor guards may cause some of the vibrations experienced by the airframe. In some examples, rotor guards can be substantially circular, and in the plane of the rotors 206. In some examples, the rotor guards may comprise a structure which may envelop part of or all the UAV 202. For example, the rotor guard may include a truss structure that is substantially circular, surrounds the UAV, and is able to absorb impact forces.

In the illustrative example, the UAV 202 is a quad-copter with four rotors 206 and four motors 208. In some examples, the UAV 202 may comprise a lesser or greater number of rotors 206, such as, for example, a tri-copter or an octocopter. In some examples, the UAV 202 may comprise a lesser or greater number of motors 208 that are coupled to and configured to drive rotors 206. For example, the UAV 202 may comprise a single motor coupled to and configured to drive the one or more rotors 206. In various examples, motors 208 may comprise electrical motors. In such examples, the electric motors may be powered by any reasonable source of electrical power, such as, for example, lithium-ion batteries, fuel cells, solar power, nuclear power, or a hybrid technology. In some examples, the motors 208 may comprise combustion engines, in some examples.

In various examples, the motors 208 and/or the rotors 206 may be coupled to the airframe 204 via a spar 212. The spar 212 may comprise carbon fiber, titanium, aluminum, plastic, combinations thereof, or any other material appropriate for aircraft construction. In some examples, the rotor 206 passing over the spar 212 may cause some of the vibrations experienced by the airframe.

The motors 208 may produce power which is transmitted to the rotors 206 via a drive shaft in order to produce thrust for propulsion. The drive shaft may comprise a metal material (e.g., aluminum, steel, stainless steel, titanium, alloys thereof, etc.), a plastic material (e.g., high-density polyethylene, acrylic, melamine, polycarbonate, etc.), a composite material (e.g., fiberglass, carbon fiber, etc.), a wood material, and combinations of the foregoing, among others. In some examples, the drive shaft may cause some of the vibrations experienced by the airframe.

In the illustrative example, the rotors 206 are the same size and/or shape (e.g. chord, thickness, and/or wingspan). In some examples, the rotors 206 may be different sizes and/or shapes. For example, the rotors 206 on a fore-end of the airframe may have a larger wingspan than the rotors 206 on an aft-end of the airframe, or vice versa.

The rotors 206 may comprise a composite material, a wood material, a plastic material, a metallic material, or a combination thereof. In various examples, the rotors 206 may be variable speed, variable pitch rotors. In other examples, the rotors 206 may be variable speed, fixed pitch rotors. In yet other embodiments, the rotors 206 may be fixed speed, variable pitch rotors. Additionally or alternatively, various examples may include one or more of the foregoing rotors used in combination with one or more of a different foregoing rotor, or other propulsion systems.

In various examples, the speed and/or pitch of the rotors may be determined by a computing system 214 based upon input from one or more inertial sensors (e.g., accelerometers, gyroscopes, magnetometers, etc.) and/or positioning sensors (e.g., global positioning sensors, ultrasonic sensors, radar systems, etc.). The inertial sensors may be configured to measure precise positioning data of the UAV 202 along three axes: heading, roll and pitch, and send the positioning data to the computing system 214.

In various examples, the computing system 214 can receive flight management input (e.g., input to control direction, velocity, altitude, waypoints, geolocation, etc.) from a remote operator. For example, the remove operator may input changes to a flight path 218 (e.g., a path of travel of a vehicle). In some examples, the UAV 202 can be configured to fly autonomously. In such examples, the flight management input can include a flight plan stored locally on the UAV 202 and accessed by the computing system 214. The flight plan may comprise a series of waypoints determined by a latitude, longitude, and altitude, a position on a 3-dimensional grid system, or a combination thereof. The series of waypoints can determine the flight path 218 of the UAV 202. In some examples, the flight path 218 can be based on images desired to be captured by a camera 216. For example, one or more of the series of waypoints may correspond to desired views of an image and/or objects to be captured in various images.

In various examples, the computing system 214 can evaluate the flight management input (e.g., from the remote operator and/or the flight plan), and anticipate changes in vibrations based on changes in aircraft attitude, rotor speed, rotor pitch, motor speed, and the like. As illustrated in FIG. 2, flight path 218 may include a first section 218(1) corresponding to straight and level flight, and a second section 218(2) corresponding to a level right-hand turn. During the first section 218(1), the airframe 204 may experience a first vibrational pattern 220(1). The first vibrational pattern 220(1) may be measured by an IMU 222 of the UAV 202.

The vibrational pattern 220 can represent a movement m (shown as positive and negative values from a neutral position) of an object (e.g., the camera, the IMU, etc.) over a time t. An amount of movement m can be represented by an amplitude 230 of the vibrational pattern 220. The vibrational pattern 220 can include a combination of vibrations from multiple sources (e.g., rotors, spars, motors, rotor guards, aerodynamic forces etc.). In various examples, the vibrational pattern 220 can include vibrations from the multiple sources in one or more axes 224 perpendicular to the camera. For example, the camera may be oriented along axis Z, and the vibrational pattern may include vibrations occurring about axis X and/or axis Y. Additionally or alternatively, the vibrational pattern can include vibrations from the multiple sources along the camera orientation axis Z.

While traveling along the first section 218(1), the IMU 222 can measure one or more dead points 226(1) and corresponding time windows. In various examples, the IMU 222 can send a signal including the dead points 226(1) and/or corresponding time windows to the camera 216. In some examples, the signal can be sent via the computing system 214. Based on the signal, the camera can capture images during the dead points 226(1). In some examples, the IMU 222 can send the dead points 226(1) and/or corresponding time windows to the computing system 214. In such examples, the computing system 214 can process images from the camera 216 and discard images captured outside of the time windows associated with the dead points 226(1).

In various examples, the computing system 214 can evaluate the flight management input and determine that the UAV 202 is at (e.g., direct input from a remote operator) and/or approaching (e.g., based on the flight plan) a waypoint 228 (e.g., a point at which an attitude, direction, and/or altitude of the UAV changes) between the first section 218(1) and the second section 218(2) of the flight path 218. In such examples, the computing system 214 can determine the adjustments to the motors 208, rotors 206, camera 216, attitude of the UAV 202, and/or any other factors to effect a maneuver at the waypoint 228, and can anticipate the second vibrational pattern 220(2).

In various examples, the second vibrational pattern 220(2) can include a vibrational pattern 220 of higher, lower or equal amplitude 230 and/or frequency, as compared to the first vibrational pattern 220(1). In the illustrative example, the second vibrational pattern 220(2) includes a substantially similar amplitude 230 to the first vibrational pattern 220(1), and a higher frequency. Based at least in part on the higher frequency, the dead points 226(2) and corresponding time windows are smaller (e.g., a shorter time window) than the dead points 226(1) of the first vibrational pattern 220(1).

In some examples, based on the anticipated second vibrational pattern 220(2), the computing system can send a signal including the anticipated dead points 226(2) and/or corresponding time windows to the camera 216. Based on the signal, the camera can capture images during the anticipated dead points 226(2). In such examples, the anticipated dead points 226(2) can be used to determine when to capture images until the IMU 222 measures the actual vibrational pattern 220 and corresponding dead points 226 associated with the second section 218(2) of the flight path 218.

Though FIG. 2 is described with respect to a UAV, as stated above, the use of the camera system as described is not limited to such an application. For example, a camera, an IMU, and a computing system may be included in an autonomous vehicle. The computing system can anticipate a change in the path of travel of a vehicle (e.g., flight path), such as an upcoming turn, and can anticipate a vibrational pattern associated therewith. The computing system can use the anticipated vibrational pattern to calculate anticipated dead points, and can trigger a camera to capture images and/or pixels of images at the anticipated dead points.

Figure 3:
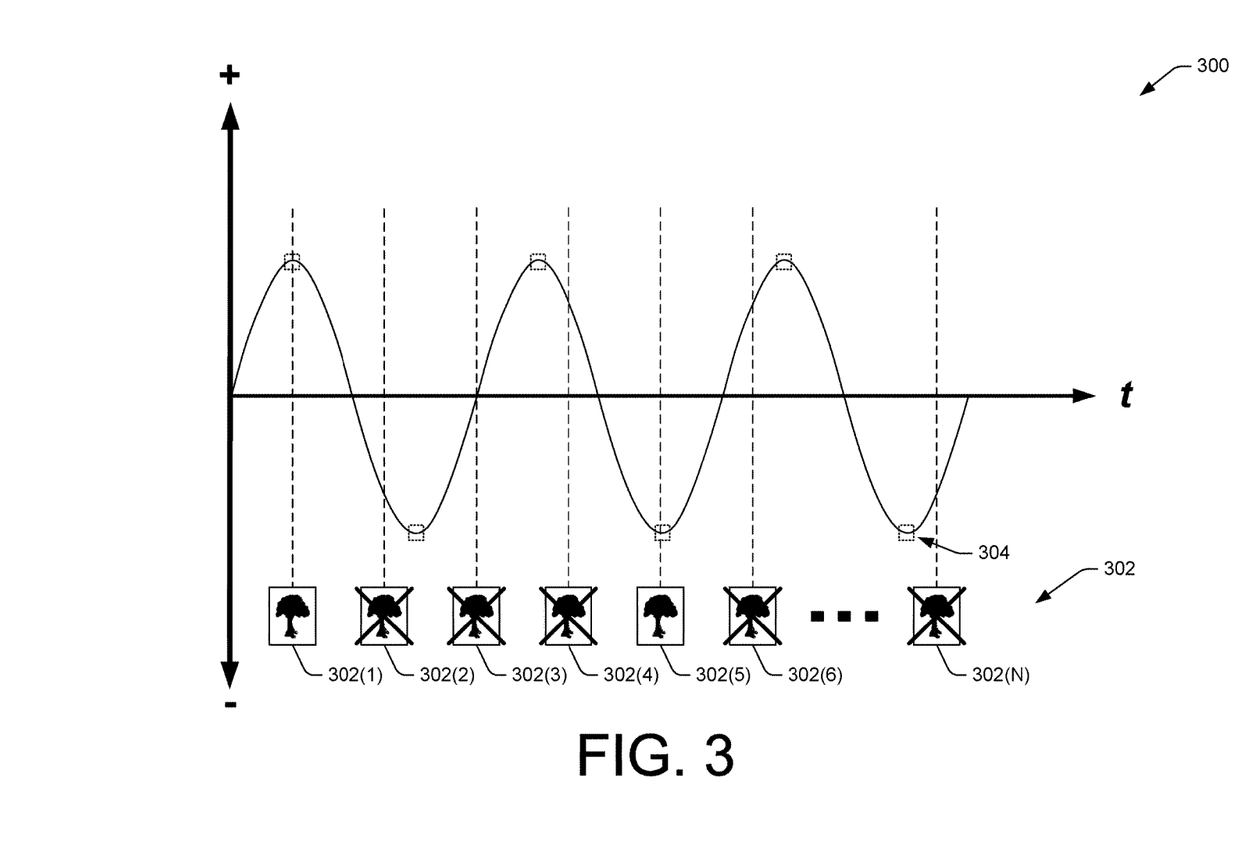
FIG. 3 is a graphical diagram of an example vibrational pattern of a camera and images captured at various points on the vibrational graph.

FIG. 3 is a graphical diagram of an example vibrational pattern 300 of a camera and images 302 captured at various points on the vibrational graph. In various examples, the vibrational pattern 300 can include vibrations experienced by the camera in the two axes perpendicular to the axis in which the camera (e.g., lens) is directed. In some examples, the vibrational pattern 300 can include vibrations experienced by the camera about three axes (e.g., X, Y, Z). In various examples, the vibrational pattern 300 can be caused by rotors, motors, forces (e.g., lift, drag, etc.) acting on a UAV to which the camera is coupled, environmental factors (e.g., wind, turbulence, etc.), and/or any other force that may cause asymmetry. The vibrational pattern 300 can be identified by an inertial measurement unit (IMU). In various examples, the IMU can be mounted in an airframe of the UAV. In some examples, the IMU can be mounted in, on, and/or proximate to the camera.

In various examples, the IMU can determine dead points 304, such as dead points 226, of the vibrational pattern 300. The dead points 304 can include time windows of the vibrational pattern in which there is minimal (e.g., little to none) acceleration. The time window can represent a period of time in which a camera can capture a clear image (e.g., an image with little to no blur due to camera shake). In some examples, the IMU can send a signal with the dead points 304 and corresponding time windows to the camera. In such examples, the camera can selectively capture images 302(1), 302(5) during the time window (e.g., capture clear images).

In various examples, the camera can capture a plurality of images 302 throughout a timespan t. In such examples, the camera can process the plurality of images 302 to determine whether a time associated with each of the plurality of images 302 corresponds to a dead point 304. Responsive to a determination that images 302(1) and 302(5) were captured during a dead point 304, the camera can store the images 302(1) and 302(5), and discard the other images 302(2), 302(3), 302(4), 302(6) and 302(N). In some examples, the camera can send the images 302(1) and 302(5) to a computing system and/or a data store on the UAV.

In some examples, such as in a camera with an electronic shutter, the camera can open the electronic shutter for a designated period (e.g. responsive to a signal from the CCD, CMOS, and/or other image sensor) to capture light in order to collect pixels of an image 302. In such examples, the camera can receive the signal with the dead points 304 from the IMU, and collect pixels corresponding to the dead points 304. For example, the shutter can be open for a period of 100 ms. The IMU can send a signal to the camera indicating a dead point 304 every 5 ms. Responsive to the signal from the IMU, the camera can selectively collect the pixels at the dead points 304.

In various examples, the image processing can be completed by a computing system. In such examples, the computing system can receive the plurality of images 302 from the camera, and the dead points 304 from the IMU. The computing system can determine that the images 302(1) and 302(5) and/or pixels of an image correspond to dead points 304, and can store the images 302(1) and 302(5) and/or pixels of the image. In some examples, the computing system can send the images 302(1) and 302(5) to an external data store via a communication channel, such as via a Wi-Fi or Bluetooth® signal.

Figure 4:
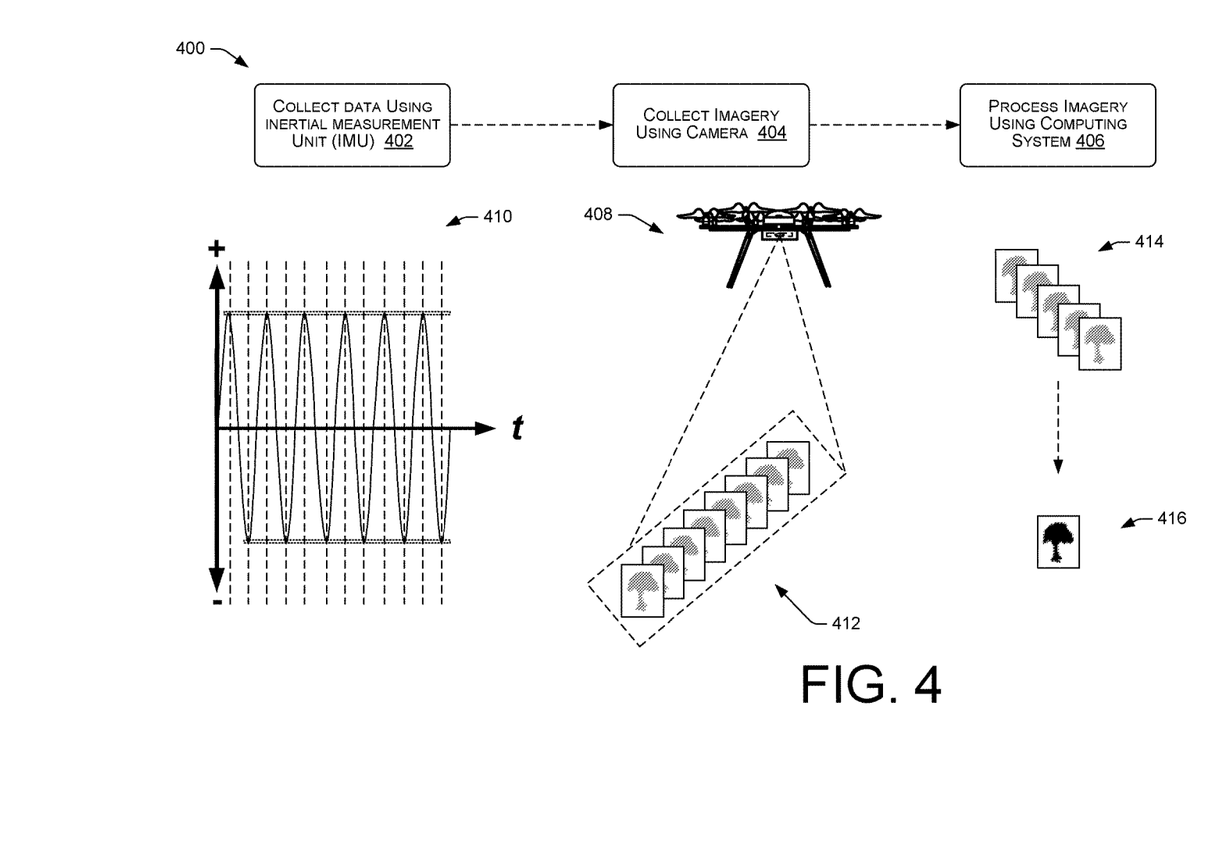
FIG. 4 is a pictorial flow diagram of an example process of an image capture optimization system in which high frequency vibrations are imposed on the camera.

FIG. 4 is a pictorial flow diagram of an example process 400 of an image capture optimization system in which high frequency vibrations are imposed on a camera.

At 402, a UAV can collect data using an IMU. The IMU can measure a vibrational pattern 408 imposed upon the camera. In various examples, the IMU can be mounted in an airframe of a UAV 408. In some examples, the IMU can be mounted in, on, and/or proximate to the camera. The vibrational pattern 410 can be a pattern of any amplitude and/or frequency. The vibrational pattern 410 can be harmonic (e.g., constant over time) or random (e.g., changes over time). In the illustrative example, the vibrational pattern 410 represents a harmonic, high frequency vibration. The vibrational pattern 410 can be caused by rotors, motors, forces (e.g., lift, drag, etc.) acting on the UAV, environmental factors (e.g., wind, turbulence, etc.), or any other force that may cause asymmetry.

In various examples, the IMU can send a signal with the vibrational pattern 410 to the camera. In such examples, the camera can determine dead points in the vibrational pattern 410. In some examples, the IMU can determine the dead points in the vibrational pattern 410, and include the dead points in the signal. The dead points can include time windows of the vibrational pattern 410 in which there is minimal acceleration. The time window can represent a period of time in which a camera can capture a clear image. The time windows associated with a high frequency vibration can be short periods of time. As such, a speed of the camera shutter cycle (e.g., open and close) must be fast to fit within the time window. Due to the speed of the fast shutter cycle, the camera may capture underexposed images (e.g., images captured with limited amount of light).

At 404, the UAV can collect imagery using a camera. The imagery can include an image and/or pixels corresponding to an image. In various examples, such as in a high frequency vibrational environment, the camera can capture a plurality of images 412 and/or pixels of images. In some examples, based in part on a fast capture used in the high vibrational environment, the plurality of images 412 and/or pixels of images can comprise underexposed images. The camera can capture the images and/or pixels of images at a fixed rate (e.g., 20 frames per second, 6 frames per second, 240 images per second, 480 images per second, etc.), or at a random rate.

In some examples, such as with an electronic shutter, the camera can cycle the shutter and/or set a pixel capture rate based on a signal from a CCD, a CMOS, or other image sensor. In such examples, the electronic shutter can remain open for a period of time, as determined by the image sensor. The camera can receive the signal from the IMU comprising the vibrational pattern 410 and/or the dead points and corresponding time windows. The camera can evaluate the time the shutter is open, and collect pixels corresponding to the time windows associated with dead points. As such, the camera can collect pixels of an image at intervals corresponding to the dead points (e.g. a time sequence corresponding to the time windows associated with the dead points). Based on the rate of pixel collection (e.g., every 5 ms during an open period of 100 ms), the pixels of the image can be underexposed images, as only a portion of the light is captured on the pixels at the rate of pixel collection.

In various examples, such as in examples with a mechanical shutter, the camera can capture the images by cycling the mechanical shutter. In such examples, the camera can receive the signal from the IMU comprising the vibrational pattern 410 and/or the dead points and corresponding time windows. The camera can compare the times associated with the underexposed images to the times associated with the dead points. The camera can store the images 412 corresponding to dead points, and discard images that do not correspond to dead points. In various examples, the camera can send the stored images 412 to a computing system of the UAV 408.

Alternatively, the computing system can perform the pre-processing of the images. In various examples, the computing system can receive the signal comprising the vibrational pattern 410 and/or the dead points and corresponding time windows from the IMU. Additionally, the computing system can receive the plurality of images 412 from the camera, e.g., the images corresponding to dead points and the images not corresponding to dead points. The computing system can compare the times associated with the images 412 to the time windows associated with the dead points. The computing system can store the underexposed images corresponding to dead points 414, and discard images that do not correspond to dead points.

At 406, the computing system can process the imagery using a computing system. The computing system can determine that the images and/or pixels of images are underexposed. In various examples, such as with an electronic shutter, the computing system can determine that the collected pixels are not fully exposed (e.g., pixels are not at the requisite exposure for a computing algorithm). In such examples, the computing system can send a signal to the image sensor to instruct the camera to open the shutter for a longer period. Responsive to the longer shutter open period, the camera can capture more light on the pixels, thereby increasing the exposure.

In some examples, the computing system can process the images corresponding to dead points 414 by blending the images 412 (e.g., underexposed images) into a fully exposed (e.g., darker) image 416. In various examples, the computing system can store the fully exposed image 416 in a local data store. In some examples, the computing system can send the fully exposed image 416 to an external computing device, such as via a communications channel. In other examples, the computing system on the UAV 408 can send the underexposed images 414 to an external computing system for processing into a fully exposed image 416.

Figure 5:
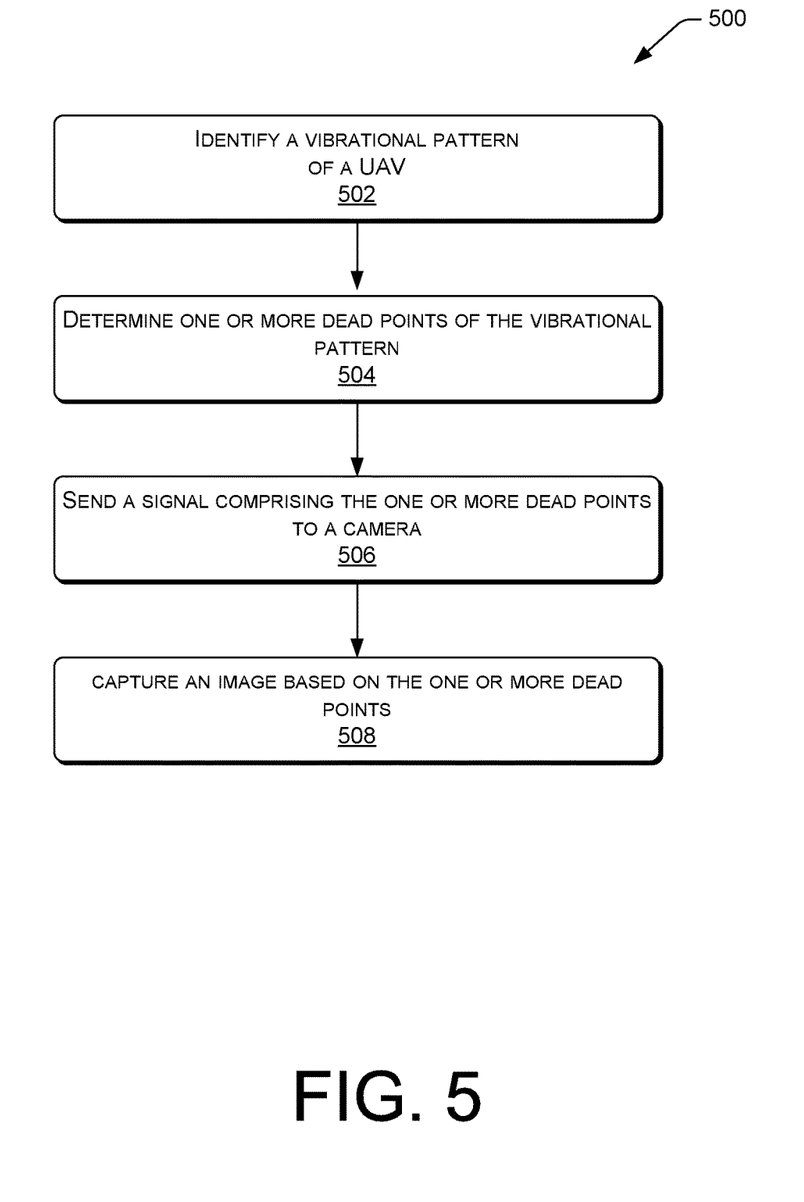
FIG. 5 is a flow diagram showing an illustrative process to capture an image during one or more dead points of a vibrational pattern.
Figure 6:
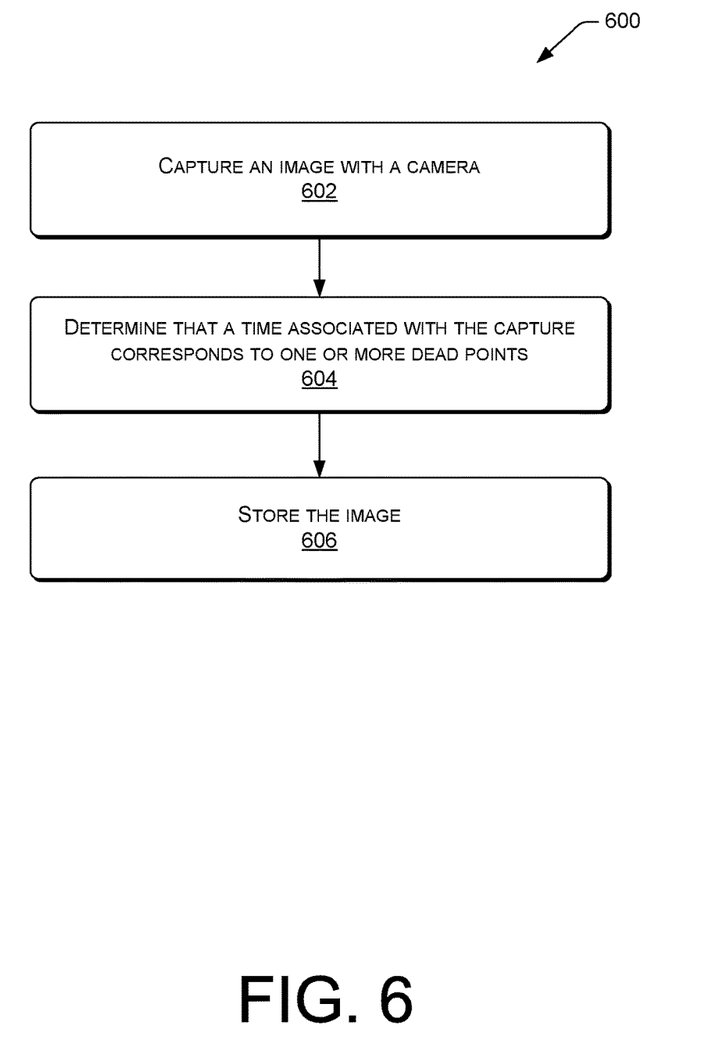
FIG. 6 is a flow diagram showing an illustrative process to evaluate captured images based on timing associated with one or more dead points of a vibrational pattern.
Figure 7:
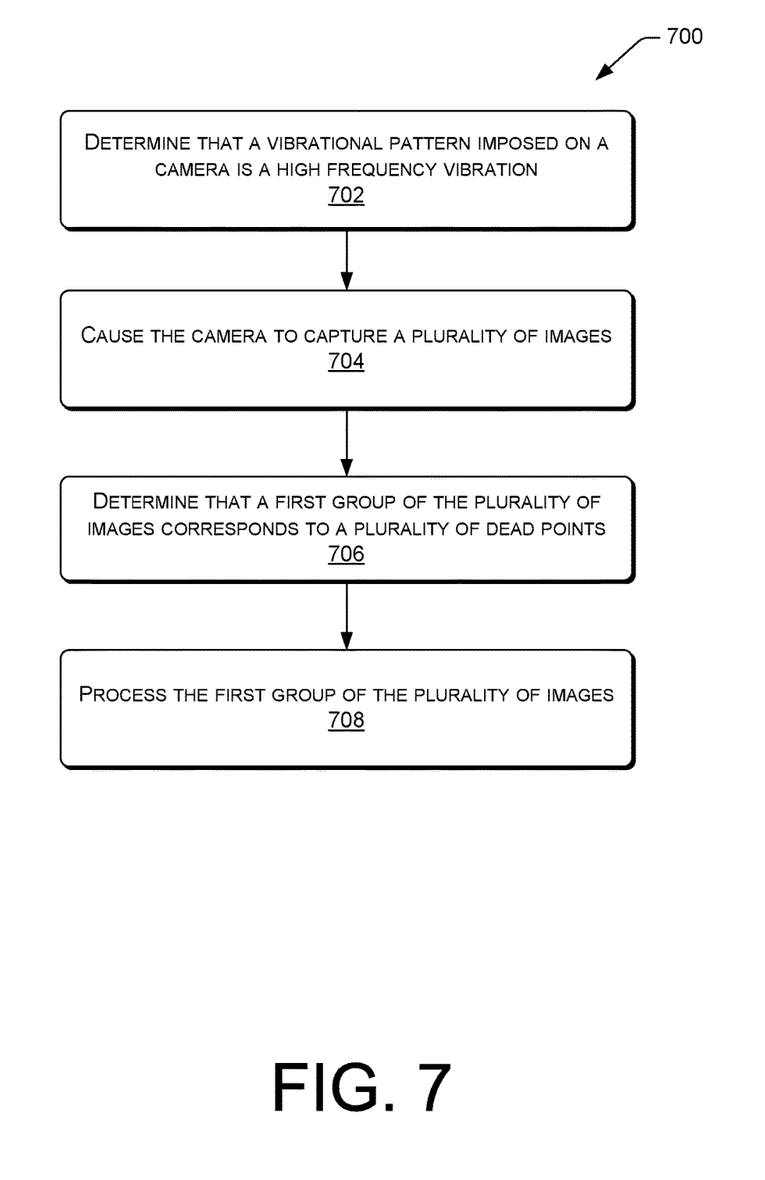
FIG. 7 is a flow diagram showing an illustrative process to capture images during periods of high frequency vibrations.

FIGS. 5-7 are flow diagrams of illustrative processes. The processes are illustrated as a collection of blocks in a logical flow graph, which represent a sequence of operations that can be implemented in hardware, software, or a combination thereof In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. The processes discussed below may be combined in any way to create derivative processes that are still within the scope of this disclosure.

FIG. 5 is a flow diagram showing an illustrative process 500 to capture an image during one or more dead points of a vibrational pattern.

At block 502, an IMU identifies a vibrational pattern of a UAV. The vibrational pattern can include a combination of vibrations from multiple sources (e.g., rotors, spars, motors, rotor guards, aerodynamic forces etc.). In various examples, the vibrational pattern can include vibrations from the multiple sources in one or more axes perpendicular to the camera. For example, the camera may be oriented along axis Z, and the vibrational pattern may include vibrations occurring about axis X and/or axis Y. Additionally or alternatively, the vibrational pattern can include vibrations from the multiple sources along the camera orientation axis Z.

The vibrational pattern can be substantially harmonic, e.g., constant over time. For example, a UAV flying straight and level may experience substantially the same vibrations throughout the flight. As such, the vibrational pattern may be harmonic. For another example, a UAV executing maneuvers in flight (e.g., turns, climbs, descents, etc.) may experience different vibrations over time. As such, the vibrational pattern over time may be random (e.g., changes over time). The vibrational pattern can include accelerations and dead points (e.g., areas of minimal or no acceleration).

In various examples, a computing system of the UAV can evaluate flight management input (e.g., from a remote operator and/or a flight plan), and anticipate changes in vibrations based on changes in aircraft attitude, rotor speed, rotor pitch, motor speed, and the like. In such examples, the computing system can identify an anticipated vibrational pattern of a UAV.

At block 504, the IMU or the computing system can determine one or more dead points of the vibrational pattern. In various examples, the one or more dead points can be detected by an accelerometer. In such examples, the accelerometer can measure accelerations in vibrations to include changes in accelerations in a positive and a negative direction. The one or more dead points can be the points between the positive and negative accelerations.

In some examples, the computing system can receive the accelerations from the accelerometer, and can identify the one or more dead points. In such examples, the computing system can identify the accelerations in the positive and negative directions, and the points between the positive and negative accelerations (e.g., dead points). The one or more dead points can include respective time windows of the vibrational pattern in which there is little to no acceleration (e.g., points between positive and negative accelerations). The time window can represent a period of time in which a camera can capture a clear image (e.g., an image with little to no blur due to camera shake).

At block 506, the IMU or the computing system can send a signal to the camera comprising the one or more dead points. The signal can include the time windows corresponding to the dead points.

At block 508, responsive to the signal, the camera can capture an image based on the one or more dead points and/or the corresponding time window. The camera can cycle a shutter (e.g., open and close) to capture the image during the time window.

FIG. 6 is a flow diagram showing an illustrative process 600 to evaluate captured images based on timing associated with one or more dead points of a vibrational pattern.

At block 602, a camera on a UAV can capture an image. The camera can capture the image by cycling a shutter at a time. In various examples, the camera can save the image with the time associated with the shutter cycle. In some examples, the camera can capture images at a periodic rate. For example, the camera can capture 60 images per minute.

For another example, the camera can capture 180 images per minute. In other examples, the camera can capture images at a non-periodic rate.

At block 604, the camera can determine that the time associated with the image capture corresponds to one or more dead points. The one or more dead points can include respective time windows of the vibrational pattern in which there is little to no acceleration. A time window can represent a period of time in which a camera can capture a clear image (e.g., an image with little to no blur due to camera shake). In various examples, the camera can receive a signal with the one or more dead points and/or time windows associated therewith from an IMU.

At block 606, the camera can store the image. In various examples, the camera can store the image in a memory of the camera. In some examples, the camera can send the image to the computing system for storage in a datastore.

FIG. 7 is a flow diagram showing an illustrative process 700 to capture underexposed images during periods of high frequency vibrations.

At block 702, a camera management system can determine that a vibrational pattern imposed on a camera is a high frequency vibration. In various examples, an IMU of the camera management system can measure the high frequency vibration.

At block 704, the camera management system can cause the camera to capture a plurality of images. In various examples, the camera management system can cause the camera to capture the plurality of images at a high shutter speed. Due to the high shutter speed, the plurality of images captured may be underexposed. In some examples, the IMU may send times associated with the dead points to the camera, and the camera may pre-process the plurality of images, discarding the images that do not correspond to dead points. In such examples, the camera may send the images to the computing system for post-processing, such as blending (e.g., combining) the multiple underexposed images.

In various examples, the camera management system, such as via a CCD, CMOS, or other image sensor, can cause a camera shutter to remain open for a given period of time to capture pixels (e.g., accumulate an amount of light on the pixels). In such examples, the camera can compare times associated with the dead points to the pixels, and collect the pixels that correspond to the times associated with the dead points.

At block 706, the camera management system can determine that a first group of the plurality of images and/or pixels corresponds to a plurality of dead points. In various examples, the IMU can determine a vibrational pattern associated with the high frequency vibrations. In such examples, the IMU can identify a plurality of dead points on the vibrational pattern. Additionally, the IMU can identify a time window associated with each of the respective dead points.

In various examples, the IMU can send a signal with the dead points and corresponding time windows to the camera. In such examples, the camera can compare a time associated with the capture of each of the images and/or pixels to the one or more dead points. The camera can store images and/or pixels with capture times that correspond to the respective time windows, and can discard other images and/or pixels. In some examples, the camera can send the plurality of images and/or pixels to a computing system for post-processing. In such examples, the computing system can receive the dead points and corresponding time windows from the IMU, and can compare the times associated with the plurality of images and/or pixels to the dead points. The computing system can store images and/or pixels with capture times associated with dead points, and can discard the other images.

At block 708, the camera management system can process the first group of the plurality of images and/or pixels. In some examples, such as in examples with mechanical shutters, the processing can include blending the first group of the plurality of images into a single image.

In other examples, such as in examples with electronic shutters, the processing can include evaluating an exposure of the pixels of an image to determine whether the image is sufficiently exposed. Responsive to a determination that the image is sufficiently exposed, the camera management system can cause the image to be saved to a data store. Responsive to a determination that the image is underexposed, the camera management system can cause the camera, such as through the image sensor, to increase a time in which the shutter remains open during a shutter cycle. Due to an increased number of instances of capturing light during the elongated shutter cycle, the pixels of the image may capture more light, thereby increasing an exposure of the image.

Figure 8:
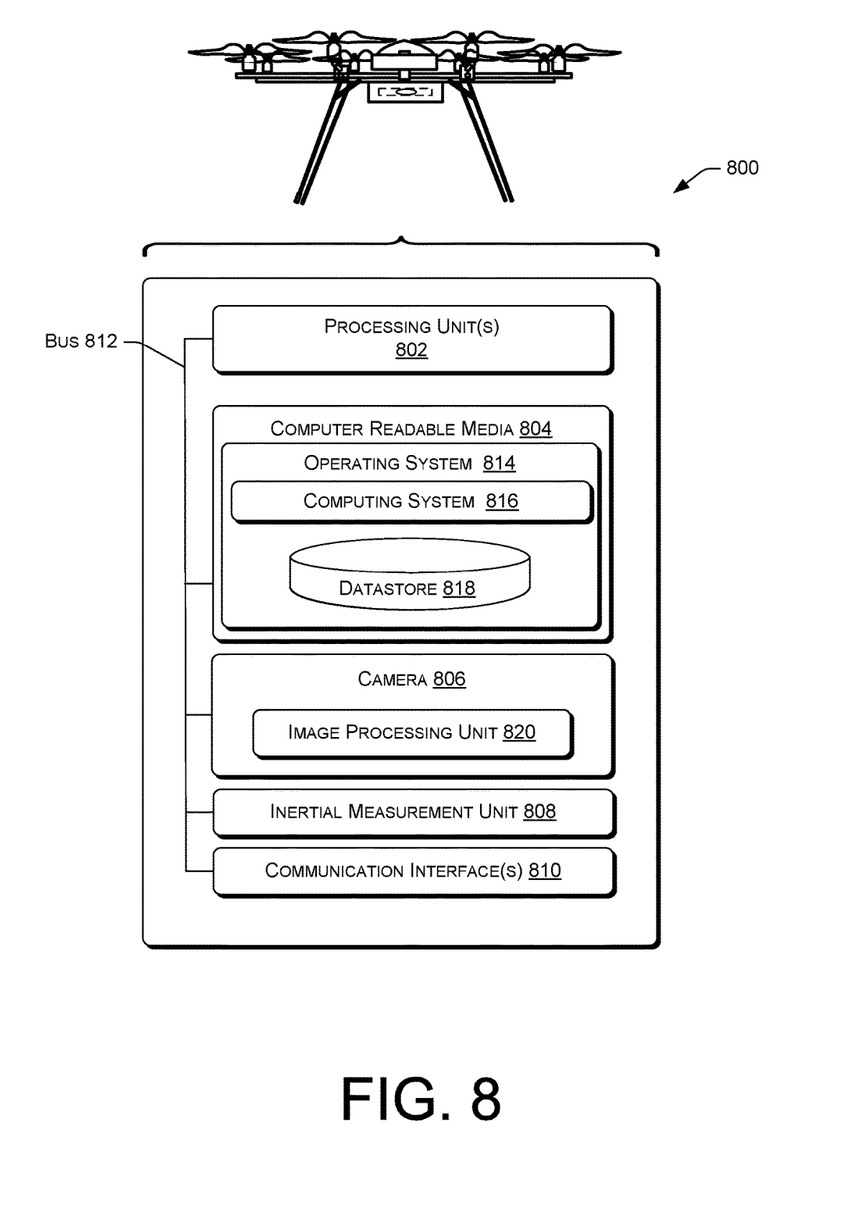
FIG. 8 illustrates example components of a UAV configured with an image capturing optimization system.

FIG. 8 illustrates example components of a UAV 800 configured with an image capturing optimization system. The UAV 800 may be any type of unmanned aerial vehicle, such as a fixed or rotary wing vehicle.

In the illustrated example, the UAV 800 includes at least one processor 802, at least one memory 804, a camera 806, an inertial measurement unit 808, and one or more communication interface(s) 810. Each processor 802 may itself comprise one or more processors or processing cores. For example, the processor 802 can be implemented as one or more microprocessors, microcomputers, microcontrollers, digital signal processors, central processing units, state machines, logic circuitries, and/or any devices that manipulate signals based on operational instructions. In some cases, the processor 802 may be one or more hardware processors and/or logic circuits of any suitable type specifically programmed or configured to execute the algorithms and processes described herein. The processor 802 can be configured to fetch and execute computer-readable processor-executable instructions stored in the memory 804. The processor(s) 802 may be operably coupled to the memory 804 via a bus 312, which in some instances can include one or more of a system bus, a data bus, an address bus, a PCI bus, a Mini-PCI bus, and any variety of local, peripheral and/or independent buses.

The memory 804 may include a tangible non-transitory computer storage media and may include volatile and non-volatile memory and/or removable and non-removable media implemented in any type of technology for storage of information such as computer-readable processor-executable instructions, data structures, program modules or other data. The memory 804 may include, but is not limited to, RAM, ROM, EEPROM, flash memory, solid-state storage, magnetic disk storage, optical storage, and/or other computer-readable media technology.

The memory 804 may be used to store and maintain any number of functional components that are executable by the processor 802. In some implementations, these functional components comprise instructions or programs that are executable by the processor 802 and that, when executed, implement operational logic for performing the actions and services attributed above to the UAV 800. Functional components of the UAV 800 stored in the memory 804 may include an operating system 814 a computing system 816, and a datastore 818. The operating system 814 of the UAV 800 may be any operating system capable of managing computer hardware and software resources.

In various examples, the computing system 816 may include a control management system configured to adjust one or more control inputs (e.g., rotor speed, rotor pitch, motor speed, flight control inputs, etc.) necessary to complete a maneuver. The maneuver can be a climb, descent, turn, hover, take-off, landing, or any other maneuver input from a remote operator and/or as determined by a flight plan.

In some examples, the computing system 816 can include an image management system configured to calculate an anticipated vibrational pattern based on the one or more control inputs required to complete a maneuver. In such examples, the computing system 816 can determine one or more dead points of the anticipated vibrational pattern, and time windows associated therewith. In some examples, the computing system 816 can provide the one or more dead points of the anticipated vibrational pattern and/or corresponding time windows to an image processing unit 820 of the camera 806.

The inertial measurement unit 808 can measure an actual vibrational pattern of the UAV 800. The inertial measurement unit 808 can determine one or more dead points of the actual vibrational pattern, and time windows associated therewith. The inertial measurement unit 808 can send the one or more dead points and corresponding time windows to the computing system 814 and/or the image processing unit 820.

In various example, the image processing unit 820 can receive one or more dead points (e.g., actual or anticipated vibrational pattern dead points) and/or corresponding time windows, and instruct the camera to capture images by cycling a shutter during the one or more dead points and/or corresponding time windows. In such examples, the image processing unit 820 can store the images captured by the camera. In some examples, the image processing unit 820 can receive the one or more dead points and/or corresponding time windows, and can evaluate a time associated with one or more images previously captured by the camera. The image processing unit 820 can pre-process the one or more images by storing the images corresponding to the one or more dead points and/or corresponding time windows, and discarding the remaining images. The image processing unit 820 can send the stored images to the computing system 816.

In various examples, the computing system 816 can receive dead points and/or corresponding time windows from the inertial measurement unit 808, and a plurality of captured images form the image processing unit 820. In such examples, the computing system 816 can evaluate a time associated with each of the plurality of images captured by the camera. The computing system 816 can pre-process the one or more images by storing the images corresponding to the one or more dead points and/or corresponding time windows, and discarding the remaining images. In some examples, the computing system 816 can store the images in a datastore 818.

Additionally or alternatively, the functionality described herein can be performed, at least in part, by one or more hardware logic components such as accelerators. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. For example, an accelerator can represent a hybrid device, such as one from ZYLEX or ALTERA that includes a CPU course embedded in an FPGA fabric.

In various examples, the UAV 800 can include one or more communication interface(s) 810. In such examples, the one or more communication interface(s) 810 can enable wireless communication via wireless signals between a remote computing device and the UAV 800. The wireless signals may include, but is not limited to, Bluetooth, radio control, voice control, electromagnetic waves, Wi-Fi signals, cell phone signals, or some combination thereof. In various examples, the one or more communication interface(s) 810 may facilitate the delivery of the one or more processed images (e.g., clear images) to the remote computing device. In some examples, the one or more communication interface(s) 810 may facilitate the receipt of one or more control inputs, such as from a remote operator.

In the context of software, the operations represent computer-executable instructions stored on one or more computer-readable storage media that, when executed by one or more processors, enable the one or more processors to perform the recited operations. Generally, computer-executable instructions include routines, programs, objects, modules, components, data structures, and the like that perform particular functions or implement particular abstract data types. The process can also be practiced in a distributed computing environment where functions are performed by remote processing devices that are linked through a communication network. In a distributed computing environment, computer-executable instructions can be located in local and/or remote computer storage media, including memory storage devices.

In the context of hardware, some or all of the blocks can represent application specific integrated circuits (ASICs) or other physical components that perform the recited operations.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A system comprising:
   one or more processors; and
   one or more memories coupled to the one or more processors, the one or more memories storing instructions executable by the one or more processors to perform acts comprising:
   measuring, by an inertial measurement unit of a vehicle, a vibrational pattern imposed on a camera of the vehicle;
   determining, by a computing device of the vehicle, one or more dead points associated with the vibrational pattern, wherein the one or more dead points comprise points of minimal acceleration in the vibrational pattern;
   identifying, by the computing device, a time window corresponding to a dead point of the one or more dead points;
   capturing, by the camera, an image based at least in part on the time window;
   storing the image in a cache of the camera; and
   sending the image to a datastore.

2. The system of claim 1, wherein the capturing the image comprises causing a shutter of the camera to be open during the time window.

3. The system of claim 1, the acts further comprising:
opening and closing a shutter of the camera to enable the camera to capture a plurality of images, wherein the image is an image of the plurality of images;
comparing times associated with each image of the plurality of images to the time window; and
determining that a time associated with the image corresponds to the time window,
wherein the sending the image to the datastore is based at least in part on the time associated with the image corresponding to the time window.

4. The system of claim 1, wherein the image is an underexposed image of an object, the acts further comprising:
capturing a plurality of underexposed images of the object;
identifying one or more time windows corresponding to the one or more dead points;
determining that a first time associated with a first underexposed image of the plurality of underexposed images corresponds to a first time window of the one or more time windows;
determining that a second time associated with a second underexposed image of the plurality of underexposed images corresponds to a second time window of the one or more time windows; and
combining information from the first underexposed image and the second underexposed image to adjust an exposure of the image.

5. The system of claim 1, the acts further comprising:
identifying, by the computing device, a change in a path of the camera;
predicting, by the computing device, an anticipated vibrational pattern based at least in part on the change in the path;
determining, by the computing device, one or more anticipated dead points of the anticipated vibrational pattern; and
capturing a second image based at least in part on the one or more anticipated dead points.

6. An unmanned aerial vehicle (UAV) comprising:
an airframe;
a camera coupled to the airframe;
an inertial measurement unit (IMU);
one or more processors; and
one or more memories storing instructions executable by the one or more processors to perform acts comprising:
measuring, by the IMU, a vibrational pattern imposed on the camera;
determining, by the IMU, one or more dead points associated with the vibrational pattern, wherein the one or more dead points comprise points of minimal acceleration in the vibrational pattern measured by the IMU;
identifying, by the IMU, one or more time windows corresponding to the one or more dead points; and
selecting an image based at least in part on a time of capture of the image corresponding to at least one of the one or more time windows.

7. The UAV of claim 6, wherein the selecting the image comprises:
causing a shutter of the camera to be open during a time window of the one or more time windows; and
storing the image in a datastore.

8. The UAV of claim 6, the acts further comprising:
sending, from the IMU to the camera, a signal comprising at least one of the one or more dead points or the one or more time windows; and
capturing the image based at least in part on the signal.

9. The UAV of claim 6, wherein the selecting the image comprises:
capturing a plurality of images by the camera;
identifying a first time associated with the image of the plurality of images captured by the camera; and
comparing the first time associated with the image to the one or more time windows.

10. The UAV of claim 6, wherein the image is an underexposed image of an object, the acts further comprising:
capturing a plurality of underexposed images of the object;
determining that a first time associated with a first underexposed image of the plurality of underexposed images corresponds to a first time window of the one or more time windows;
determining that a second time associated with a second underexposed image of the plurality of underexposed images corresponds to a second time window of the one or more time windows; and
combining information from the first underexposed image and the second underexposed image to adjust an exposure of the image.

11. The UAV of claim 6, the acts further comprising:
identifying, by a computing device of the UAV, a change in a flight path;
predicting, by the computing device, an anticipated vibrational pattern based at least in part on the change in the flight path;
determining, by the computing device, one or more anticipated dead points of the anticipated vibrational pattern; and
capturing one or more images based at least in part on the one or more anticipated dead points.

12. The system of claim 11, wherein the predicting the anticipated vibrational pattern further comprises:
identifying, by the computing device, a maneuver associated with the change in the flight path;
determining, by the computing device, a flight control input used to effect the maneuver; and
identifying, by the computing device, one or more vibrations caused by the flight control input.

13. The UAV of claim 6, wherein the IMU is mounted in the camera.

14. The UAV of claim 6, wherein the IMU is mounted in the airframe proximate to the camera.

15. A method comprising:
identifying, by an inertial measurement unit on a vehicle, a vibrational pattern;
determining, by a computing device on the vehicle, one or more dead points of the vibrational pattern, wherein the one or more dead points comprise points of minimal acceleration in the vibrational pattern;
determining, by the computing device, one or more time windows associated with the one or more dead points; and
storing an image in a cache of a camera based at least in part on the one or more dead points.

16. The method of claim 15, further comprising:
opening and closing a shutter of the camera at a time corresponding to a time window of the one or more time windows, wherein a cycle of the shutter enables the camera to capture the image, and
sending the image to a datastore.

17. The method of claim 15, further comprising:
capturing a plurality of images by the camera;
identifying a time associated with each image of the plurality of images captured by the camera; and
comparing the time associated with each image to the one or more time windows,
wherein the storing the image in the cache of the camera is based at least in part on the time associated with each image corresponding to a time window of the one or more time windows.

18. The method of claim 15, further comprising:
receiving a first signal from an image sensor;
responsive to receiving the first signal, opening an electronic shutter of the camera for a first period and capturing light on a plurality of pixels;
determining a sequence of the one or more time windows; and
collecting a group of the plurality of pixels corresponding to the sequence of the one or more time windows,
wherein the group of the plurality of pixels corresponds to the image stored in the cache of the camera.

19. The method of claim 18, further comprising:
determining that the image is an underexposed image; and
receiving a second signal from the image sensor based at least in part on a determination that the image is underexposed, wherein the second signal comprises an instruction to open the shutter for a second period, the second period being longer than the first period.

20. The method of claim 15, further comprising:
identifying, by the computing device, a change in a path of the camera;
predicting, by the computing device, an anticipated vibrational pattern based at least in part on the change in the path, wherein the predicting the anticipated vibrational pattern comprises:
identify a maneuver associated with the change in the path;
determining an input used to effect the maneuver; and
identifying one or more vibrations caused by the input;
determining, by the computing device, one or more anticipated dead points of the anticipated vibrational pattern;
determining, by the computing device, an anticipated sequence of one or more anticipated time windows corresponding to the one or more anticipated dead points; and
capturing, by the camera, images based at least in part on the anticipated sequence.

* * * * *